US 011528235B2

(12) United States Patent
Chang (10) Patent No.: US 11,528,235 B2
(45) Date of Patent: Dec. 13, 2022

(54) INTERNET OF THINGS RESOURCE SUBSCRIPTION METHOD, DEVICE, AND SYSTEM (71) Applicant: Huawei Cloud Computing Technologies Co., Ltd., Guizhou (CN)

(72) Inventor: Hongna Chang, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 16/814,382

(22) Filed: Mar. 10, 2020

(65) Prior Publication Data
US 2020/0213244 A1 Jul. 2, 2020

Related U.S. Application Data (63) Continuation of application No. PCT/CN2018/104547, filed on Sep. 7, 2018.

(30) Foreign Application Priority Data

Sep. 11, 2017 (CN) .......................... 201710813841.8

(51) Int. Cl.
*G06F 15/173* (2006.01)
*H04L 47/70* (2022.01)
(52) U.S. Cl.
CPC ..................................... *H04L 47/82* (2013.01)
(58) Field of Classification Search
CPC ......... H04L 67/26; H04L 67/32; H04L 67/16; H04W 4/02; H04W 4/70; G16Y 30/00; G16Y 40/00
See application file for complete search history.

(56) References Cited

U.S. PATENT DOCUMENTS

| 2004/0133641 | A1 | 7/2004 | McKinnon et al. |
| 2014/0359133 | A1 | 12/2014 | Tian et al. |
| 2015/0215768 | A1 | 7/2015 | Dong et al. |
| 2015/0295785 | A1 | 10/2015 | Fan |

(Continued)

FOREIGN PATENT DOCUMENTS

| CN | 102739425 A | 10/2012 |
| CN | 103227803 A | 7/2013 |

(Continued)

OTHER PUBLICATIONS

"Lightweight Machine to Machine Technical Specification," Approved Version 1.0, Feb. 8, 2017, Open Mobile Alliance, OMA-TS-LightweightM2M-V1_0-20170208-A, 138 pages.

*Primary Examiner* — Suraj M Joshi
*Assistant Examiner* — Jaren Means
(74) *Attorney, Agent, or Firm* — Conley Rose, P.C.

(57) ABSTRACT

An Internet of Things resource subscription method includes a parameter that is added to a subscription request message such that the device identifies, in a multiple-resource subscription scenario, parameters that need to be reported and parameters only used as subscription determining conditions. The Internet of Things resource subscription method can further enable a server to flexibly set, using a logical expression, a subscription condition in a subscription request.

20 Claims, 5 Drawing Sheets (56) References Cited

U.S. PATENT DOCUMENTS

| | | | |
|---|---|---|---|
| 2016/0088420 A1* | 3/2016 | Kim | H04W 28/16 370/328 |
| 2016/0192111 A1 | 6/2016 | Choi et al. | |
| 2017/0134523 A1 | 5/2017 | Wu | |
| 2018/0167785 A1* | 6/2018 | Wang | H04W 4/06 |
| 2019/0238617 A1* | 8/2019 | Novo Diaz | H04L 67/02 |
| 2020/0177681 A1* | 6/2020 | Wang | H04L 47/801 |

FOREIGN PATENT DOCUMENTS

| | | |
|---|---|---|
| CN | 103795689 A | 5/2014 |
| CN | 104506345 A | 4/2015 |
| CN | 105228111 A | 1/2016 |
| CN | 105376706 A | 3/2016 |
| EP | 2362591 A2 | 8/2011 |
| EP | 2800339 A1 | 11/2014 |
| EP | 2913977 A2 | 9/2015 |
| JP | 2011198379 A | 10/2011 |
| JP | 2015536081 A | 12/2015 |
| JP | 2016526322 A | 9/2016 |
| KR | 20160008526 A | 1/2016 |
| WO | 2013189394 A2 | 12/2013 |
| WO | 2016187515 A1 | 11/2016 |
| WO | 2017087367 A1 | 5/2017 |

* cited by examiner

INTERNET OF THINGS RESOURCE SUBSCRIPTION METHOD, DEVICE, AND SYSTEM

CROSS-REFERENCE TO RELATED APPLICATIONS

This application is a continuation of International Patent Application No. PCT/CN2018/104547 filed on Sep. 7, 2018, which claims priority to Chinese Patent Application No. 201710813841.8 filed on Sep. 11, 2017. Both of the aforementioned applications are hereby incorporated by reference in their entireties.

TECHNICAL FIELD

This application relates to the communications field, and in particular, to an Internet of Things resource subscription method, a device, and a system.

BACKGROUND

Various Internet of Things services and applications, such as Internet of Vehicles, Smart Home, intelligent medical services, and remote meter reading, generate massive data on a large quantity of Internet of Things devices, such as sensors, intelligent devices or terminals. To reduce impact of the massive data on performance of a transmission network and various devices, especially a device with a limited capability, it is expected to reduce interactions of data or messages to the greatest extent in a design and deployment of an Internet of Things system, to occupy fewer transmission resources and consume less energy of the devices, and prolong a service life of a battery, and the like.

Using a resource subscription mechanism, a terminal or a device can proactively report resource information of the terminal or the device to a server, and the server does not need to frequently query the terminal or the device, thereby reducing message interactions between the server and the terminal. In an actual service scenario, the server sometimes needs to monitor a plurality of resources, a plurality of object instances, or a plurality of objects simultaneously. However, using the current resource subscription mechanism, usually, only a single resource or a single object instance can be subscribed. For example, in a lightweight machine to machine (LwM2M) Internet of Things communication protocol, a resource is subscribed using a write-attributes operation and an observe operation. However, in the write-attributes operation, only a subscription rule of a single resource, a single object instance or a single object can be set, and in the observe operation, only a single resource, a single object instance or a single object can be subscribed.

SUMMARY

This application provides an Internet of Things resource subscription method, a device, and a system, to meet a service requirement of flexible subscription to a plurality of resources, object instances or objects in an actual service scenario.

According to a first aspect, this application provides an Internet of Things resource subscription method. A server sends a request message to a device. The request message includes an identifier of a first resource and a first parameter. The first resource includes a first child resource and a second child resource. The first parameter is used to instruct the device to send an updated resource value to the server. The device determines that a preset condition or a condition specified by the server is met, and sends an updated child resource value in the first resource to the server. An instruction of sending the updated resource value is added to a subscription request message such that the device only needs to send the updated resource value to the server, thereby reducing performance consumption of the device and the server and bandwidth occupation of a transmission network.

In a possible embodiment, the device determines that the preset condition or the condition specified by the server is met, a current value of the first child resource is different from a value that is of the first child resource and that is sent to the server last time, and a current value of the second child resource is the same as a value that is of the second child resource and that is sent to the server last time, and the device sends the current value of the first child resource to the server.

In a possible embodiment, the request message sent by the server to the device further includes a second resource and a second parameter. The second parameter includes a condition for determining the second resource. When determining that the second resource meets the condition included in the second parameter, the device sends the updated resource value to the server.

According to a second aspect, this application provides another Internet of Things resource subscription method. A server sends a request message to a device. The request message includes an identifier of a first resource and an identifier of a second resource. The request message further comprises a first parameter and a second parameter. The second parameter includes a condition for determining the second resource. The first parameter is used to instruct that a value of the second resource does not need to be sent to the server. When determining that the second resource meets the condition included in the second parameter, the device sends a current value of the first resource to the server. The method enables the server to clearly instruct, in the subscription request message, the device resources that need to be reported and resources only used as subscription determining conditions. When determining that a subscription condition is met, the device does not need to report a value of a resource identified as a resource that does not need to be reported such that not only occupation of a transmission resource is reduced, but also subscription is more flexible. In addition, because an amount of data reported by a device side and an amount of data to be processed by a server side are reduced, performance consumption of the device side and the server side is also reduced.

According to a third aspect, this application further provides an Internet of Things resource subscription method. A server sends a request message to a device. The request message includes an identifier of a first resource, a first parameter, an identifier of a second resource, a second parameter and a third parameter. The first parameter includes a condition for determining the first resource. The second parameter includes a condition for determining the second resource. The third parameter includes a data reporting condition. The data reporting condition is a logical combination that determines the first resource based on the first parameter and that determines the second resource based on the second parameter. The device determines that the first resource and the second resource meet the data reporting condition, and sends a current value of the first resource and a current value of the second resource to the server. The subscription method can enable the server to flexibly set, using a logical expression, a subscription condition, thereby greatly improving flexibility of resource subscription in a multiple-resource subscription scenario.

The data reporting condition may be a logical expression including logical relationships such as "and", "or" and "non". For example, the data reporting condition may be that the first resource meets the condition included in the first parameter and the second resource meets the condition included in the second parameter. The data reporting condition may alternatively be that the first resource meets the condition included in the first parameter or the second resource meets the condition included in the second parameter.

According to a fourth aspect, this application provides an Internet of Things server, to implement functions of the Internet of Things server in the method according to the first aspect, the second aspect or the third aspect. The functions may be implemented by hardware, or may be implemented by hardware by executing corresponding software. The hardware or software includes one or more modules corresponding to the foregoing functions.

According to a fifth aspect, this application provides an Internet of Things device, to implement functions of the Internet of Things device in the method according to the first aspect, the second aspect or the third aspect. The functions may be implemented by hardware, or may be implemented by hardware by executing corresponding software. The hardware or software includes one or more modules corresponding to the foregoing functions.

According to a sixth aspect, this application provides a computer-readable storage medium. The computer-readable storage medium stores an instruction. When the instruction is run on a computer, the computer is enabled to perform the method according to the first aspect, the second aspect or the third aspect.

According to a seventh aspect, this application provides a computer program product including an instruction. When the instruction is run on a computer, the computer is enabled to perform the method according to the first aspect, the second aspect or the third aspect.

According to an eighth aspect, this application provides an Internet of Things system for implementing resource subscription. The system includes at least the foregoing Internet of Things server and the foregoing Internet of Things device.

DESCRIPTION OF EMBODIMENTS

Figure 1:
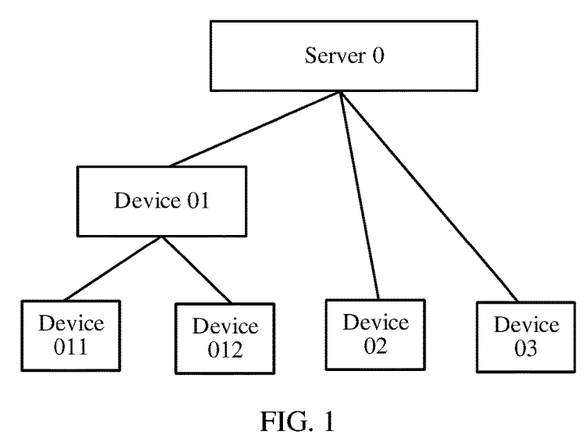
FIG. 1 is a schematic architectural diagram of an Internet of Things system according to an embodiment of the present disclosure.

FIG. 1 shows an Internet of Things system. A device 01, a device 02 and a device 03 are connected to a server 0, and the server 0 performs management, such as device software and hardware upgrading, device function control, resource subscription, and resource querying, on the device 01, the device 02 and the device 03. The server 0 may be an Internet of Things connection management platform or an Internet of Things application server. A device 011 and a device 012 are connected to the server 0 through the device 01, and the device 01 may be considered as an intermediate device between the server 0 and the device 011/012, such as a home gateway, or a convergence gateway. A message or data between the server 0 and the device 011/012 is forwarded through the device 01, and the device 01 may also perform processing, such as data preprocessing/filtering or communication protocol conversion or message format conversion on the forwarded message or data. For example, in Smart Home, intelligent terminal devices with different short-range communications technologies are supported to communicate with a home gateway in different connection manners and using different message formats, and then the home gateway is connected to the server in a same connection manner and using a same message format. Compared with the server 0, the device 01 shields a difference between communication protocols and a difference between message formats on an access side such that the server 0 can perform connection and management on different terminal devices.

It should be noted that a manner of connection or a communication protocol between the server 0 and any device is not limited in this application. For example, between the server 0 and the device 01, a wired connection may be used, and data transmission or message transmission is performed using a constrained application protocol (CoAP). Between the server 0 and the device 02, a cellular-based narrow band Internet of Things (NB-IoT) wireless connection technology may be used, and data transmission or message transmission is performed using a message queuing telemetry transport (MQTT) protocol.

It should also be noted that, for ease of description, the server and the devices are numbered in this application. Numerals in names of the server 0, the device 01, the device 02, the device 03, the device 011 and the device 012 represent only numbers, and do not constitute any limitation to the server or the devices.

In an Internet of Things technology, a server manages a device in a form of a resource. The "resource" herein is an abstract concept, may refer to a device in a physical form, static attributes such as a model, software and hardware versions, and a manufacturer of the device, or dynamic attributes such as an operation that the device can perform, an event and a parameter that the device can report and a state parameter that the device can read. Each resource has a unique identifier, and the identifier may be a name or a uniform resource identifier (URI) or any other type or format that distinguishes and identifies the resource. In this application, the URI is used as an example to identify a resource. For example, assuming that a URI of the server 0 is "/server0", URIs of the device 01, the device 011, the device 012, the device 02 and the device 03 are respectively "/server0/device01", "/server0/device01/device011", "/server0/device01/device011", "/server0/device02" and "/server0/device03".

A URI of a resource such as a static attribute or a dynamic attribute of a device may vary depending on a device model. At a date of submission of this application, there is no uniform standard and definition for a device model or a data model in the field of the Internet of Things. For ease of description, in this application, a URI of a resource provided by a device is described using a device model of the LwM2M protocol as an example. A person skilled in the art may understand that a device model or a resource identifier defined by another standard may also be used when a technical solution provided in an embodiment of this application is implemented.

Figure 2:
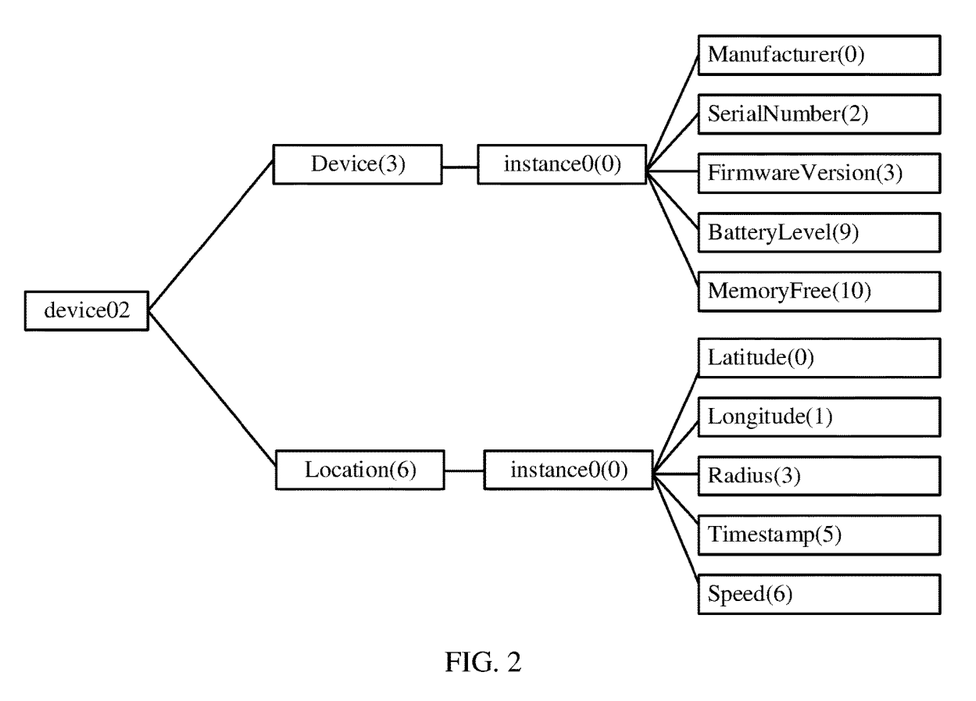
FIG. 2 is a schematic structural diagram of device resources according to an embodiment of the present disclosure.

Assuming that the device 02 is an intelligent wearable device that can provide a location service, a resource structure of the device 02 is shown in FIG. 2. The device 02 (device02) includes two objects, that is, Device and Location. The "object" may be understood as a set of resources with similar attributes or functions. A number of Device is 3, a number of Location is 6, and a same "object" may have one or more instances instance. In an example shown in FIG. 2, both of the objects Device and Location have only one instance, and numbers of the instances are 0. The object instance includes a plurality of resources, and each resource has a respective number. The numbers may be combined as a URI to identify a specific resource in the device 02. For example, if device02 is a root path (for example, the root path is /server0/device02), "/3/0/9" may indicate a BatteryLevel resource in the device 02, and "/6" indicates all resources in all instances included in the Location object in the device 02. It should be noted that the foregoing "object" or "object instance" may also be considered as a "resource". Correspondingly, "/3/0/9" BatteryLevel is a child resource of Device (3).

Figure 3:
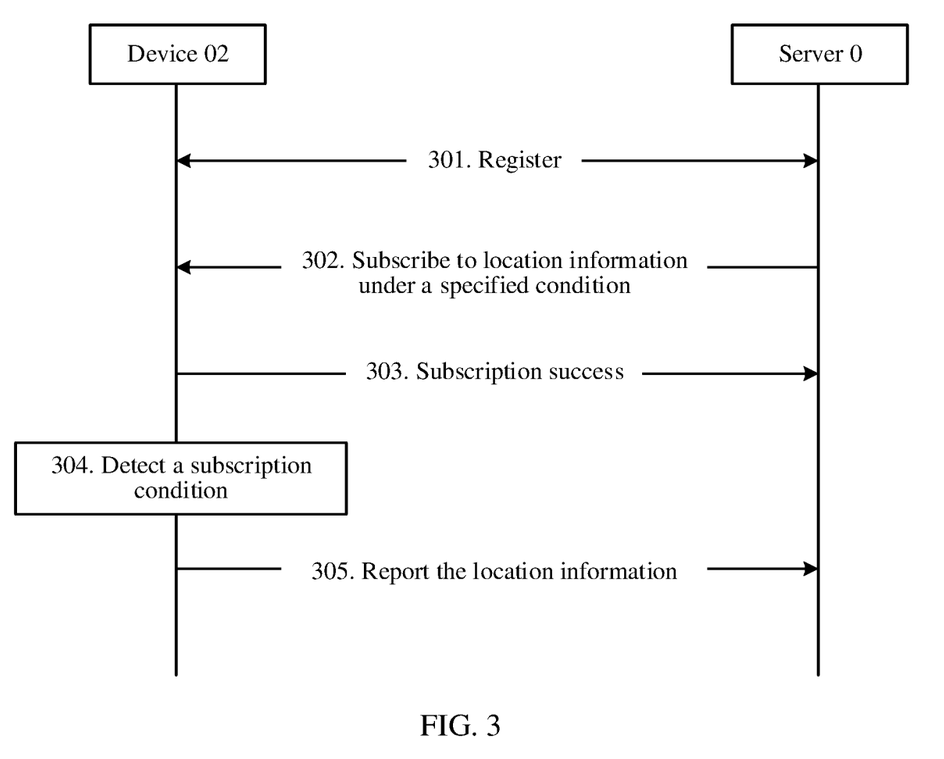
FIG. 3 is a flowchart of a resource subscription method according to an embodiment of the present disclosure.

Assuming that the server 0 wants to subscribe to location information of the device 02 when a speed of the device 02 is greater than a specified value, the server 0 may subscribe to location information under a specified condition from the device 02 using a method shown in FIG. 3.

301. The device 02 first registers with the server 0. The device 02 registers, in a registration request message, the objects, the instances and the resources included in the device02 shown in FIG. 2 with the server 0, and the registration message includes at least URIs of the objects, the instances or the resources relative to the device 02 (that is, URIs when the device02 is a root path), such as "/3", "/3/0" or "/3/0/9". The server 0 allocates a URI, such as "/server0/device02", to the device 02 in a registration response message. In another possible implementation, alternatively, the device 02 may register only the device02, and the server 0 finds the URIs of the objects, the instances or the resources included in the device02 using a discovery procedure.

302. It is assumed that after learning of the objects, the instances, and the resources included in the device 02 in a registration procedure or the discovery procedure, the server 0 subscribes to longitude and latitude information of the device 02 from the device 02 when the speed of the device 02 is greater than five meters per second. A subscription request may be implemented using a plurality of messages. In this embodiment, a Fetch message is used as an example. The server 0 sends the Fetch message to the device 02. The Fetch message not only includes a URI of a Speed resource included in the device02, a condition that Speed is greater than five meters per second, and an instruction that Speed is only used as a subscription determining condition and a Speed value does not need to be reported, but also includes URIs of a Latitude resource and a Longitude resource. Information included in the foregoing subscription request may be expressed as follows.

FETCH CT=application/vnd.oma.lwm2m+json
{"e":[
{"n": "/6/0/6", "gt": "5", "ra": "1"},
{"n": "/6/0/0"},
{"n": "/6/0/1"}]
} where "e" represents a resource array, "n" represents a resource name or a URI, "gt" represents greater than, and "ra": "1" represents that the Speed resource is only used as a determining condition in this subscription and does not need to be reported. If a value of "ra" is "0" or "ra" is not included, it indicates that a resource value needs to be reported. The Fetch message includes URIs of three resources, that is, "/6/0/6", "/6/0/0" and "/6/0/1". Two parameters are attached after the resource "/6/0/6", where one of the parameters indicates a condition for determining the "/6/0/6" resource, and the other parameter indicates that a value of the "/6/0/6" resource does not need to be reported. It should be noted that the foregoing Fetch message may further include another parameter or information, such as the URI "/server0/device02" of the device 02. Details are not described herein again.

303. The device 02 sends a subscription success response message to the server 0.

304. The device 02 determines or detects the Speed resource based on a subscription condition specified by the server 0.

305. When determining that the Speed resource is greater than five meters per second, the device 02 sends the current "/6/0/0" and "/6/0/1" resources to the server, that is, values of Latitude and Longitude.

In the foregoing embodiment, the server 0 adds an instruction that reporting is not required, such as "ra": "1", to the subscription request such that an amount of data reported by the device 02 to the server 0 is reduced, bandwidth and device consumption are reduced, and accuracy and efficiency of subscription are improved. The device 02 only needs to report a value of a resource specified by the server 0, and the server 0 does not need to receive or process a value of a resource that is not concerned by the server 0, such as a Speed value.

In the foregoing embodiment, in the subscription request, the server 0 uses a variation of a resource as a subscription condition for reporting another resource. However, in an actual application scenario, the server 0 may need to use variations of a plurality of resources as the subscription condition simultaneously. For example, the server 0 may need to subscribe to location information of the device 02 when Speed is greater than five meters per second (assuming that a numerical unit of the Speed resource is meter/second) and a battery level BatteryLevel is less than 20% (assuming that a numerical unit of the BatteryLevel resource is percentage %), and the server 0 needs to combine Speed and BatteryLevel as the subscription condition of the location information. For example, the information included in the subscription request in 302 of FIG. 3 is the Fetch message, including the following.

FETCH CT=application/vnd.oma.lwm2m+json
{"e":[
{"n": "/6/0/6", "gt": "5"},
{"n": "/3/0/9", "lt": "20"},
{"n": "/6/0/0"},
{"n": "/6/0/1"}],
"re": "(/6/0/6&/3/0/9)"
} where "re" represents a data reporting condition, including a relationship between conditions for determining a plurality of resources. As shown above, "(/6/0/6&/3/0/9)" represents that the data reporting condition is that conditions for determining the resource "/6/0/6" and the resource "/3/0/9" are synchronously met, that is, when determining that "/6/0/6" is greater than five meters per second and "/3/0/9" is less than 20%, the device 02 reports values of "/6/0/6" Speed, "/3/0/9" BatteryLevel, "/6/0/0" Latitude and "/6/0/1" longitude to the server 0. If the server 0 only needs to obtain location information, the server 0 may also set "/6/0/6" Speed and "/3/0/9" BatteryLevel as resources that do not need to be reported, to reduce the amount of data to be reported. Then, for example, the information included in the subscription request in 302 is the Fetch message, including the following.

FETCH CT=application/vnd.oma.lwm2m+json
 "e":[
  {"n": "/6/0/6", "gt": "5", "ra": "1"},
  {"n": "/3/0/9", "lt": "20", "ra": "1"},
  {"n": "/6/0/0"},
  {"n": "/6/0/1"}],
 "re": "(/6/0/6&/3/0/9)"
}.

It should be noted that a logical relationship between two or more resource determining conditions in the data reporting condition "re" may be a logical relationship such as "and", "or" and "non" or a combination of a plurality of logical relationships, and this is not limited in this embodiment of the present disclosure.

Figure 4:
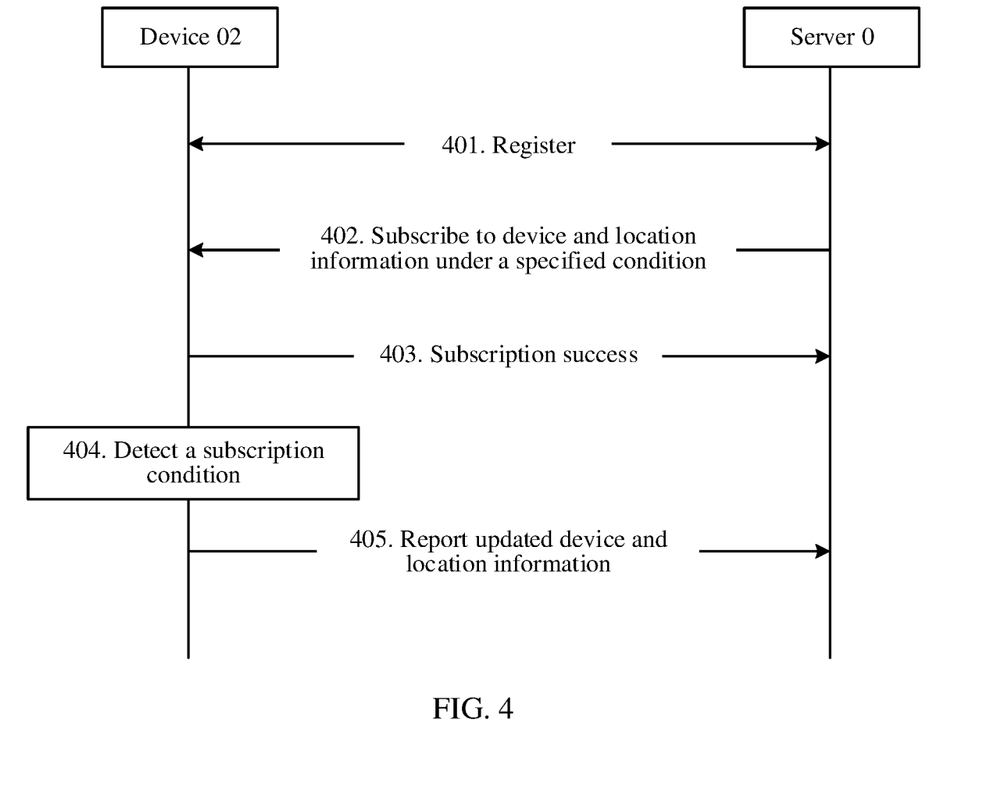
FIG. 4 is a flowchart of another resource subscription method according to an embodiment of the present disclosure.

As described above, in the field of the Internet of Things, due to massive devices and data, a quantity of messages sent between a device and a server and an amount of data sent between a device and a server needs to be reduced to the greatest extent, to reduce consumption of a device, a network and a system. Using the resource structure shown in FIG. 2 as an example, in other approaches, when the server 0 needs to subscribe to variations of a plurality of resources in an object in the device 0, all resources in the object are usually subscribed using the object as a unit. For example, when the object Device(3) is subscribed, the device 02 needs to report values of all resources in the object Device(3) each time the device 02 reports data to the server. Actually, values of some resources, such as Manufacturer and SerialNumber may not change. If the unchanged resource values are reported to the server for a plurality of times, not only network bandwidth is occupied, but also performance of the device and the server is consumed. Therefore, the server needs to instruct the device to report only a resource value that is updated relative to previous reporting or a resource value that changes relative to the previous reporting. As shown in FIG. 4, the server 0 subscribes to device and location information from a registered device 02 under a condition that Speed is greater than five meters per second. Using the Fetch message as an example, a resource subscription request message in 402 includes the following.

FETCH CT=application/vnd.oma.lwm2m+json
 {"e":[
  {"n": "/6/0/6", "gt": "5", "ra":
  {"n": "/6},
  {"n": "3"}],
  "rf": "1"
 }
where "rf": "1" represents that only a changed resource value is reported in a resource array included in "e". When determining that the Speed resource "/6/0/6" meets a subscription condition in step 404, the device 02 reports a changed or an updated resource value in the object Device (3) and the object Location(6) to the server in step 405.

It should be noted that when juxtaposed with "e", the parameter "rf" acts on each object and resource in "e", and the parameter "rf" may also be used as an additional parameter of a single object or resource and only acts on the single object or resource, the following is an example.

FETCH CT=application/vnd.oma.lwm2m+json
 {"e":[
  {"n": "/6/0/6", "gt": "5", "ra": "1"},
  {"n": "/6},
  {"n": "/3, "rf": "1"}]
 }.
In this case, the parameter "rf" only works on the object Device(3), and when reporting data, the device 02 reports a changed resource value in the object Device(3) and all resource values in the object Location(6).

The solutions provided in the embodiments of the present disclosure are described above mainly from perspectives of a subscription procedure and message interaction. It may be understood that, to achieve the foregoing functions, entities such as a server and a device include a corresponding hardware structure and/or a software module to perform each of the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 5:
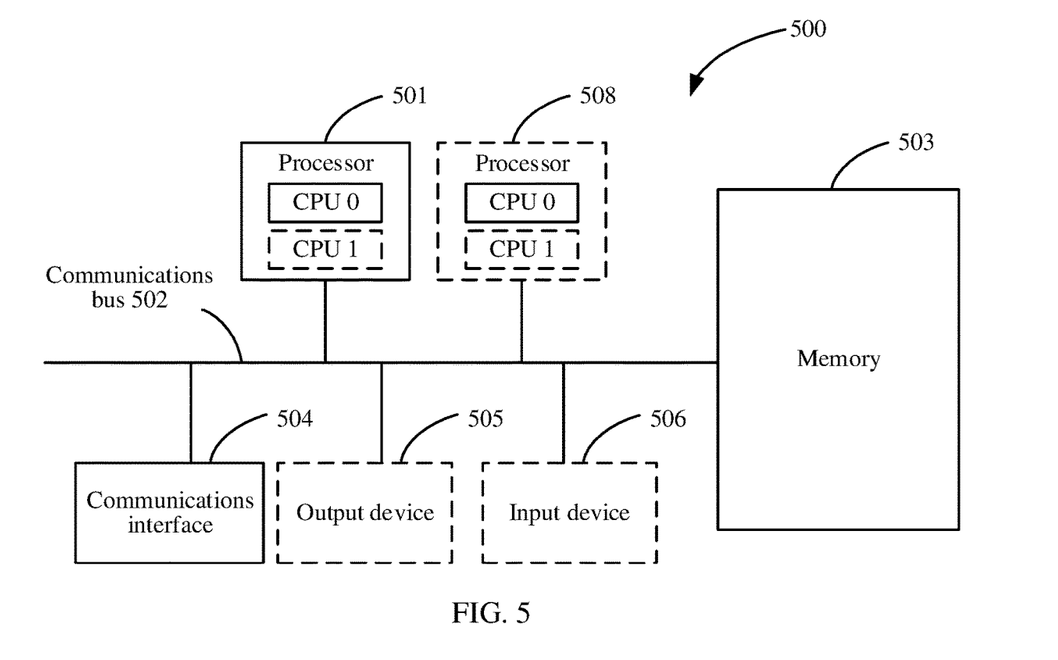
FIG. 5 is a schematic diagram of a computer device according to an embodiment of the present disclosure.

For example, as shown in FIG. 5, the server or the device entity in FIG. 1 may be implemented using a computer device (or system) in FIG. 5.

FIG. 5 is a schematic diagram of a computer device according to an embodiment of the present disclosure. The computer device 500 includes at least one processor 501, a communications bus 502, a memory 503 and at least one communications interface 504.

The processor 501 may be a central processing unit (CPU), a microprocessor, an application-specific integrated circuit (ASIC), or one or more integrated circuits configured to control program execution of solutions of the present disclosure.

The communications bus 502 may include a path transmitting information between the foregoing components.

The communications interface 504 uses any type of transceiver, and is configured to communicate with another device or communications network, such as the Ethernet, a radio access network (RAN), and wireless local area networks (WLAN).

The memory 503 may be a read-only memory (ROM), a static storage device of another type that can store static information and an instruction, a random access memory (RAM), or a dynamic storage device of another type that can store information and an instruction, or may be an electrically erasable programmable read-only memory (EEPROM), a compact disc read-only memory (CD-ROM) or another optical disk storage, an optical disc storage (including a compact disc, a laser disc, an optical disc, a digital versatile disc (DVD), a BLU-RAY disc, or the like), a magnetic disk storage medium or another magnetic storage device, or any other medium that can be used to carry or store expected program code in an instruction or data structure form and that can be accessed by a computer, but the present disclosure is not limited thereto. The memory may exist independently and is connected to the processor through the bus. Alternatively, the memory may be integrated with the processor.

The memory 503 is configured to store application program code executing the solutions of the present disclosure, and the processor 501 is configured to control execution. The processor 501 is configured to execute the application program code stored in the memory 203, thereby implementing a function in the method of this patent.

During specific implementation, in an embodiment, the processor 201 may include one or more CPUs, such as a CPU 0 and a CPU 1 in FIG. 5.

During specific implementation, in an embodiment, the computer device 200 may include a plurality of processors, such as the processor 501 and a processor 508 in FIG. 5. Each of the processors may be a single-CPU processor, or a multi-CPU processor. The processor herein may be one or more devices, circuits, and/or processing cores configured to process data (such as a computer program instruction).

During specific implementation, in an embodiment, the computer device 500 may further include an output device 505 and an input device 506. The output device 505 communicates with the processor 501, and can display information in a plurality of manners. For example, the output device 205 may be a liquid crystal display (LCD), a light emitting diode (LED) display device, a cathode ray tube (CRT) display device, a projector, or the like. The output device 506 communicates with the processor 501, and can receive an input from a user in a plurality of manners. For example, the input device 206 may be a mouse, a keyboard, a touchscreen device, a sensing device, or the like.

The computer device 500 may be a general-purpose computer device or a special-purpose computer device. During specific implementation, the computer device 500 may be a desktop computer, a portable computer, a network server, a personal digital assistant (PDA), a mobile phone, a tablet computer, a wireless terminal device, a communications device, an embedded device, or a device with a similar structure in FIG. 5. A type of the computer device 500 is not limited in this embodiment of the present disclosure.

In this embodiment of the present disclosure, function module division may be performed on the server or the device. For example, function modules may be divided corresponding to functions, or two or more functions may be integrated in one module. The integrated module may be implemented in a form of hardware, or may be implemented in a form of a software functional module. It should be noted that, in this embodiment of the present disclosure, module division is exemplary, and is merely a logical function division. In actual implementation, another division manner may be used.

Figure 6:
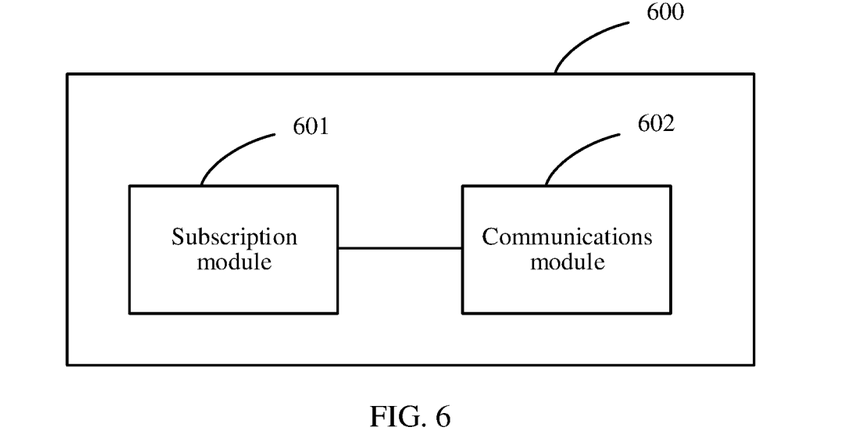
FIG. 6 is a schematic diagram of function modules of a server according to an embodiment of the present disclosure.

For example, FIG. 6 is a possible schematic structural diagram of a server entity in the foregoing embodiment. The server 600 includes a subscription module 601 and a communications module 602. The subscription module 601 is responsible for constructing the subscription request message in the foregoing embodiment, and sending the subscription request message to the device using the communications module 602, such as a message in 302 in FIG. 3 and a message in 402 in FIG. 4. The communications module 602 may be further configured to receive data reported by the device, such as a message in 305 in FIG. 3 and a message in 405 in FIG. 4, and forward the subscription module 601 to parse and process the messages.

Figure 7:
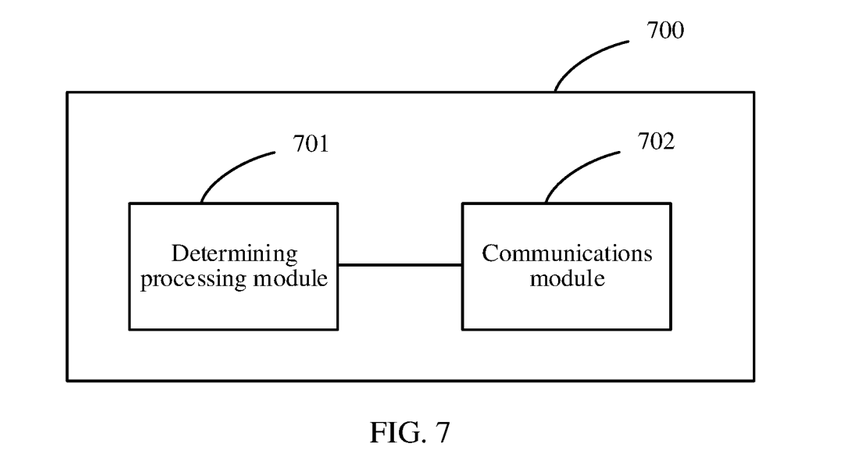
FIG. 7 is a schematic diagram of function modules of a device according to an embodiment of the present disclosure.

For example, FIG. 7 is a possible schematic structural diagram of a device entity in the foregoing embodiment. The device 700 includes a determining processing module 701 and a communications module 702. The determining processing module 701 is responsible for performing parsing on a subscription request message received by the communications module 702, and constructing a data reporting message when determining that a subscription condition is met, and reporting to the server using the communications module 702, such as the message in 305 in FIG. 3 and the message in 405 in FIG. 4.

The function modules may be implemented in a form of hardware, or may be implemented in a form of a software functional module. In a simple embodiment, a person skilled in the art may figure out that the subscription module 601 of the server 600 or the determining processing module 701 of the device 700 may be implemented by the processor 501 in FIG. 5 by invoking code in the memory 503, and this is not limited in this embodiment of the present disclosure.

All or some of the foregoing embodiments may be implemented by means of software, hardware, firmware, or any combination thereof. When software is used to implement the embodiments, the embodiments may be implemented or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

It should be further noted that the parameters such as "ra", "re" and "rf" described in the embodiments of the present disclosure may be used independently or in combination. In the foregoing embodiments of the present disclosure, procedures and messages are described using the device 02 and the Fetch message as an example. A person skilled in the art should understand that the foregoing procedure is also applicable to other devices registering with the server, such as the device 01 and the device 011, and is also applicable to a method procedure of subscription using another message. Message examples, parameter names, and formats in the foregoing embodiments are only a possible implementation. Any modification, equivalent replacement, improvement, and the like made without departing from the technical solutions and idea of the present disclosure should fall within the scope of the present disclosure.

What is claimed is:

1. An Internet of Things resource subscription method implemented by a device and comprising:
    sending, to a server, a registration request message registering an object, an instance, or a resource of the device;

receiving, from the server, a request message comprising an identifier of a first resource, an identifier of a second resource, a first parameter, and a second parameter, wherein the second parameter comprises a condition for determining the second resource, and wherein the first parameter instructs the device not to send a value of the second resource to the server;

determining that the second resource meets the condition specified by the second parameter; and sending, to the server when the second resource meets the condition, a message comprising a current value of the first resource and not comprising the value of the second resource.

2. The Internet of Things resource subscription method of claim 1, wherein the first resource comprises a first child resource and a second child resource, and wherein the current value of the first resource comprises a current value of the first child resource and a current value of the second child resource.

3. The Internet of Things resource subscription method of claim 2, wherein the request message further comprises a third parameter, wherein the third parameter instructs the device to send an updated resource value to the server, and wherein a current value of the first resource comprises an updated value of the first resource.

4. The Internet of Things resource subscription method of claim 3, wherein the current value of the first child resource is different from a value of the first child resource that is sent to the server previously, wherein the current value of the second child resource is the same as a value of the second child resource that is sent to the server previously, and wherein the Internet of Things resource subscription method further comprises sending the current value of the first child resource to the server and not sending the current value of the second child resource to the server.

5. The Internet of Things resource subscription method of claim 1, wherein the request message is for resource subscription.

6. The Internet of Things resource subscription method of claim 1, wherein the request message is a FETCH message.

7. An Internet of Things resource subscription method implemented by a device and comprising:

sending, to a server, a registration request message registering an object, an instance, or a resource of the device;

receiving, from the server, a request message comprising an identifier of a first resource, a first parameter, an identifier of a second resource, a second parameter, and a third parameter, wherein the first parameter comprises a condition for determining the first resource, wherein the second parameter comprises a condition for determining the second resource, wherein the third parameter comprises a data reporting condition, and wherein the data reporting condition is a logical combination that determines the first resource based on the first parameter and that determines the second resource based on the second parameter;

determining that the first resource meets the data reporting condition;

determining that the second resource meets the data reporting condition; and sending, to the server when the first resource and the second resource meet the data reporting condition, a message comprising a current value of the first resource and not comprising a current value of the second resource.

8. The Internet of Things resource subscription method of claim 7, wherein the data reporting condition is when the first resource meets the condition comprised in the first parameter and the second resource meets the condition comprised in the second parameter, and wherein the Internet of Things resource subscription method further comprises:

determining that the first resource meets the condition comprised in the first parameter;

determining that the second resource meets the condition comprised in the second parameter; and sending the current value of the first resource to the server.

9. The Internet of Things resource subscription method of claim 7, wherein the data reporting condition is when the first resource meets the condition comprised in the first parameter or the second resource meets the condition comprised in the second parameter, and wherein the Internet of Things resource subscription method further comprises:

determining that the first resource meets the condition comprised in the first parameter or the second resource meets the condition comprised in the second parameter; and sending the current value of the first resource to the server.

10. The Internet of Things resource subscription method of claim 7, wherein the request message is a FETCH message.

11. An Internet of Things resource subscription method implemented by a server and comprising:

receiving, from a device, a registration request message registering an object an instance, or a resource of the device; and sending, to the device, a request message comprising an identifier of a first resource, an identifier of a second resource, a first parameter, and a second parameter, wherein the second parameter comprises a condition for determining the second resource, wherein the first parameter instructs the device not to send a value of the second resource to the server, wherein the request message instructs the device to send a resource reporting message to the server responsive to a condition specified by the second parameter being met, and wherein the resource reporting message includes a current value of the first resource and not including the value of the second resource.

12. The Internet of Things resource subscription method of claim 11, wherein the first resource comprises a first child resource and a second child resource, wherein the current value of the first resource comprises a current value of the first child resource and a current value of the second child resource, and wherein the method further comprises receiving the resource reporting message from the device for the request message, wherein the resource reporting message comprises a value of the first child resource.

13. The Internet of Things resource subscription method of claim 11, wherein the request message further comprises a third parameter, wherein the third parameter instructs the device to send an updated resource value to the server, and wherein a current value of the first resource comprises an updated value of the first resource.

14. The Internet of Things resource subscription method of claim 11, wherein the request message is a FETCH message.

15. An Internet of Things device comprising:
a communications interface configured to:
send to a server, a registration request message registering an object, an instance, or a resource of the Internet of Things device; and receive, from the server, a request message comprising an identifier of a first resource, an identifier of a second resource, a first parameter, and a second parameter, wherein the second parameter comprises a condition for determining the second resource, and wherein the first parameter instructs the Internet of Things device not to send a value of the second resource to the server; and a processor coupled to the communications interface and configured to determine that the second resource meets the condition specified by the second parameter, wherein the communications interface is further configured to send, to the server when the second resource meets the condition message comprising a current value of the first resource and not comprising the value of the second resource.

16. The Internet of Things device of claim 15, wherein the first resource comprises a first child resource and a second child resource, and wherein the current value of the first resource comprises a current value of the first child resource and a current value of the second child resource.

17. The Internet of Things device of claim 16, wherein the request message further comprises a third parameter, wherein the third parameter instructs the Internet of Things device to send an updated resource value to the server, and wherein a current value of the first resource comprises an updated value of the first resource.

18. The Internet of Things device of claim 17, wherein the current value of the first child resource is different from a value of the first child resource that is sent to the server previously, wherein the current value of the second child resource is the same as a value of the second child resource that is sent to the server previously, and wherein the instructions further cause the Internet of Things device to be configured to send the current value of the first child resource to the server and not send the current value of the second child resource to the server.

19. The Internet of Things device of claim 15, wherein the request message is for resource subscription.

20. The Internet of Things device of claim 15, wherein the request message is a FETCH message.

* * * * *

UNITED STATES PATENT AND TRADEMARK OFFICE
CERTIFICATE OF CORRECTION

| | |
|---|---|
| PATENT NO. | : 11,528,235 B2 |
| APPLICATION NO. | : 16/814382 |
| DATED | : December 13, 2022 |
| INVENTOR(S) | : Hongna Chang |

It is certified that error appears in the above-identified patent and that said Letters Patent is hereby corrected as shown below:

In the Claims

Claim 11, Column 12, Line 29: "an object an instance, or" should read "an object, an instance, or"

Signed and Sealed this
Twenty-fourth Day of January, 2023

*Katherine Kelly Vidal*

Katherine Kelly Vidal
*Director of the United States Patent and Trademark Office*